Oct. 30, 1923.
M. A. SWEET ET AL
1,472,284
MEASURING DEVICE
Filed May 3, 1922  2 Sheets-Sheet 1
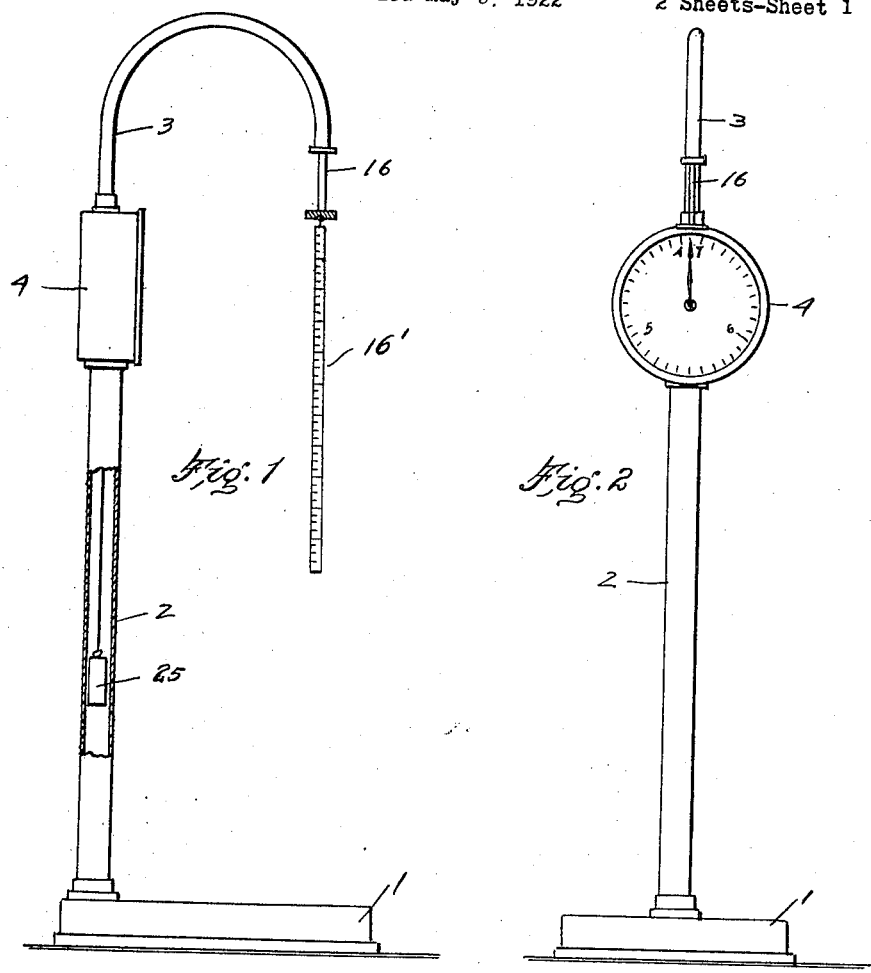

Oct. 30, 1923.
M. A. SWEET ET AL
1,472,284
MEASURING DEVICE
Filed May 3, 1922  2 Sheets-Sheet 2
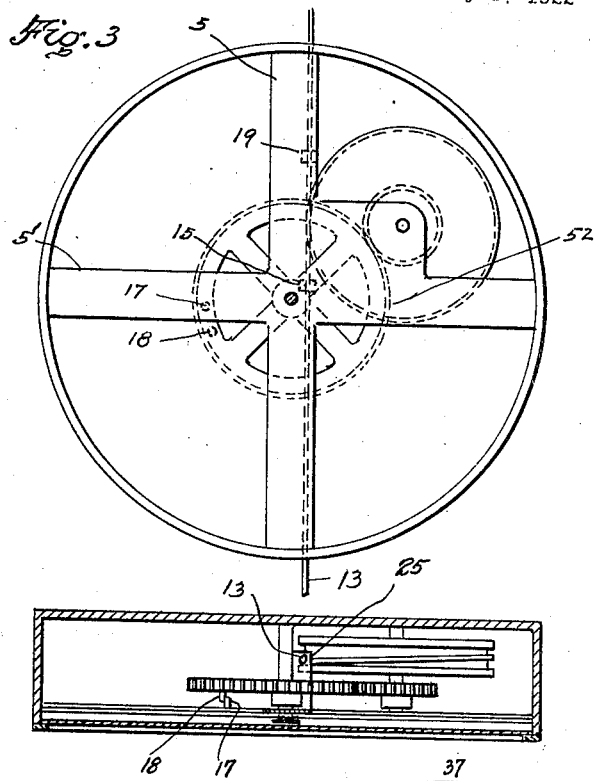
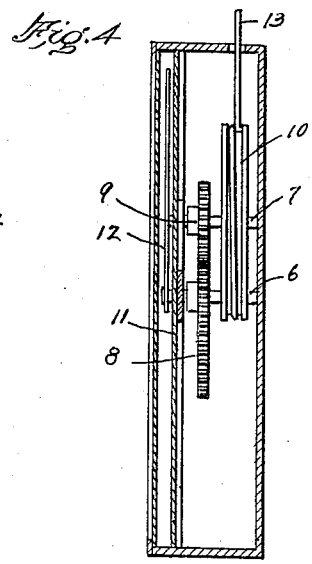
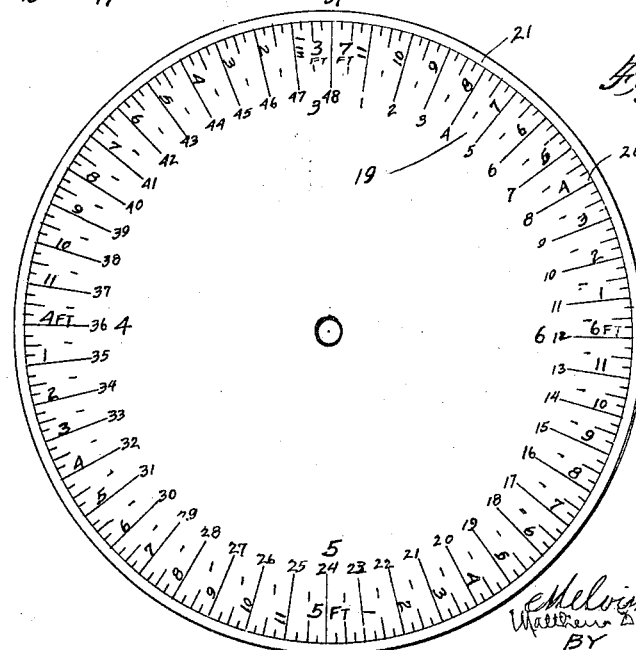
INVENTOR
Melvin A. Sweet
Matthew D. Ferron
BY
F. N. Gilbert
ATTORNEY.

Patented Oct. 30, 1923.

1,472,284

UNITED STATES PATENT OFFICE.

MELVIN A. SWEET AND MATTHEW D. FERNAN, OF BINGHAMTON, NEW YORK.

MEASURING DEVICE.

Application filed May 3, 1922. Serial No. 558,318.

*To all whom it may concern:*

Be it known that we, MELVIN A. SWEET and MATTHEW D. FERNAN, citizens of the United States, residing at Binghamton, in the county of Broome and State of New York, have invented certain new and useful Improvements in Measuring Devices, of which the following is a specification.

Our invention relates to apparatus for measuring the height of persons and animals as well as measuring different parts of the body. The object in view, being to provide a mechanism of the class described embodying a graduated dial, a pointer adapted to move around the graduated face of the dial and in connection therewith to display when moved by the operator, the correct measurement of the height of the person operating or using the mechanism or whose height it is desired to compute; and to measure different parts of the body, together with an operating element, by means of which, when the measuring plate is positioned at the point of measurement the pointer on the dial is simultaneously turned or moved around the face of the same, indicating the feet and inch measurement and fraction thereof in the measurement desired. With these objects in view, our invention consists of certain novel features of construction and arrangement of parts as will be hereinafter more fully described and illustrated in the accompanying drawings and pointed out in the claims hereunto appended.

Figure 1 is a side view of our device in side elevation.

Figure 2 is a front view of our device in front elevation.

Figure 3 is a rear view of a detailed part of our device.

Figure 4 is an edge view in cross section of a part of our device.

Figure 5 is a plan view in cross section of part of our device.

Figure 6 is a front view of the dial.

The same reference characters denote like parts in each of the several figures of the drawings. In carrying out our device, the numeral 1 represents a platform, preferably hollow and made of metal. Rising from the rear of the platform 1, is a hollow standard 2 and which terminates at its upper end in a curved hollow arm 3, that overhangs the platform. Integral with said standard 2, we have the hollow casing 4, having within it a frame work, consisting of the vertical portion 5 and horizontal extensions 5' and 5². Within the casing, we have mounted the shafts 6 and 7; mounted on shaft 6 we have the gear 8 and mounted on shaft 7, we have the gear 9, and the grooved pulley 10. The shaft 6 extends thru the dial 11. Mounted in the casing 4 and on the end of shaft 6, we have mounted the pointer 12. Within the hollow standard 2 and arm 3, we extend a suitable cord 13 having on its outer end the plate 16. The cord passing into the casing, passes thru guide 19 and around pulley 10 and thru guide 15, mounted on the interior of frame 5 and thence into the continuation of standard 2 and has mounted on its lower end of cord 13 the weight 25. The plate 16 on the outer end of cord 13 is the measuring plate, adapted to fix the distance point on the person or animal in the measure to be taken. On the interior of frame 5, we have the projecting lug 17 and on the inner side of gear 8, we have the lug 18, adapted to contact with lug 17. In the operation of our device, as a further part of our device, we have the before mentioned dial plate 11 and on the outer margin of the same, we have a graduated scale border 19; the pointer 12, mounted on the end of shaft 6 is adapted to point towards the scale lines or divisions. The purpose of the scale is to indicate measurement as low as 3 feet and as high as 7 feet of persons or animals measured; altho we elect to construct the device so as to indicate a much wider scope of measurement without departing from the spirit of our invention. In our device feet measurement are indicated by the numerals reading from left to right of 4, 5, 6 and 7. These spaces are subdivided by cross marks 20 which makes space divisions indicating inches and designated by an interior line of numerals around the border from 1 to 48. The whole border being divided generally into four spaces above mentioned, indicating feet. The outer scale marks 21 are subdivisions indicating fractions of an inch, half and quarters. Within the center of the outer border we have a central line of numerals indicating inches which are designed to be read from right to left.

The line of numerals on the inner side of the circular border, are for fractional measurements of the body or parts of the same up to 48 inches. The weight 15 drawing on cord 13 turning pulley 10 and gear 9 meshed with gear 8, turns shaft 6 and with it the pointer 12 to the left until the pointer 12 resumes its normal position always pointing at the mark line between 3 and 7 or zero mark line on the dial; the cord held in this extended spaced position by the plate 16 on the outer end of cord 13 contacting with the end of tube 3 which prevents further movement and the pointer, thus at rest and held in this position indicates also the greatest height measurement to wit 7 feet. In operation the pointer starting at 7 feet, moving to the right, indicates any height down to 3 feet, the completion of its movement as it is thus moved around to the zero mark line between 3 and 7, indicating both the greatest height measure as well as the shortest height measure. Here the movement of the pointer is stayed by the lug 18 on gear 8, contacting with the lug 17, and preventing further movement of pulley 10 in that direction. It is to be noted that the set of numerals in the center of the border are used to indicate measurement of height of the body, in inches as spaced by the measuring plate 16, while the set of numerals on the inside of the border line can be used to indicate measurements in feet and inches of different parts of body. And we elect for our purpose as a part of our device to suspend in any convenient manner from the measuring plate 16 a tape, which tape 16' may be used for measuring arms and hands and other body measurements of parts of the body which cannot be well reached by the direct vertical movement of plate 16; in measuring an arm, for example, we extend the tape and pin a point in the tape against the shoulder, we then extend that point on the tape to the outer extremity of the arm, and this movement drawing on the tape and with it plate 16, and cord 13, will cause the pointer on the dial to point to the movement of inches in the arm measurement or any other extended surface.

In the operation of our device, the person to be measured stands upon the platform which is in line with plate 16 on the end of arm 3 and with his hands or by aid of an assistant grasps plate 16 and draws the plate down in contact with the top of his head. The drawing on cord 3 lifts weight 15 and turns pulley 10 and with it the intermediate gears and pinions and turns pointer 12 as before described until the downward movement ceases in contact with the head, and the pointer indicates on the dial the measuring point reached. This accomplished, on releasing plate 16, gravity acting on weight 15 draws down the weight, turns the pinions and pointer 12 to its original vertical position, held by plate 16 in contact with the end of arm 3.

Thus having described our invention what we claim as new and for which we desire Letters Patent is as follows:—

1. In a device of the character described the combination of a platform, a hollow standard, rising therefrom, and having an intermediate casing and integral therewith and projecting at its upper end into an arm overhanging said platform, a dial on the face of said casing having a graduated scale of feet and inch measurement on the border thereof; shafts mounted in said casing, a pulley mounted on one of said shafts and gears mounted on each of said shafts in alinement with the opening in said standard; a pointer shaft mounted in said casing passing thru said dial, a pointer mounted on said shaft, a cord passing through said shaft and casing and around said pulley having at its upper end a stop plate, contacting with the outer end of the said arm and on its lower end a weight.

2. In a device of the character described the combination of a platform, a hollow standard, mounted therefrom, a casing portion intermediate and integral with said standard, said standard having at its upper end an arm overhanging said platform, a measuring dial on the face of the casing, having a graduated scale on the face border thereof, indicating feet, inches and hand measurement; a pulley shaft, with a pulley having a plurality of grooves thereon; a gear mounted on said shaft, a pointer shaft in casing and passing thru said dial, a pointer mounted theron, gear connection between pulley shaft and pointer shaft, a cord passing thru arm shaft and casing and around said pulley, a stop plate on the upper and outer end of cord, a weight on the lower end, means within the casing for limiting the outward drawing of the cord.

3. In a device of the class described the combination of a platform, a hollow standard rising from the rear thereof, a casing at the upper end of said standard, a curved hollow arm extending from the upper end of the casing and overhanging the platform, a dial in the front of said casing having graduations thereon, and a central opening, a pair of shafts mounted in said casing, one of said shafts extending through the opening in the dial and provided with a pointer on its projected end, a pulley mounted on the other shaft, intermeshing gears mounted on said shafts whereby rotative movement may be imparted from the pulley shaft to the pointer shaft, a stop plate at the outer end of the curved hollow arm, a flexible connection secured to the stop plate and running through the curved hollow arm around the pulley in the casing and depending into the hollow standard and a movable weight in the said hollow standard and attached to the depending end of the flexible connection.

In testimony whereof we have affixed our signatures.

MELVIN A. SWEET.
MATTHEW D. FERNAN.